July 22, 1930. H. WEICHSEL Re. 17,742

ALTERNATING CURRENT MOTOR

Original Filed Nov. 12, 1923

INVENTOR
Hans Weichsel
BY E. E. Huffman
ATTORNEY

Reissued July 22, 1930 Re. 17,742

UNITED STATES PATENT OFFICE

HANS WEICHSEL, OF ST. LOUIS, MISSOURI, ASSIGNOR TO WAGNER ELECTRIC CORPORATION, OF ST. LOUIS, MISSOURI, A CORPORATION OF DELAWARE

ALTERNATING-CURRENT MOTOR

Original No. 1,553,345, dated September 15, 1925, Serial No. 674,131, filed November 12, 1923. Application for reissue filed October 18, 1926. Serial No. 142,414.

Figure 1:
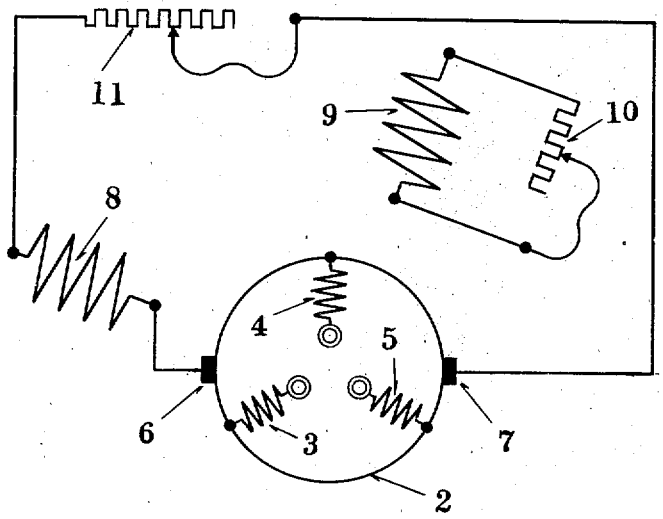
Figure 2:
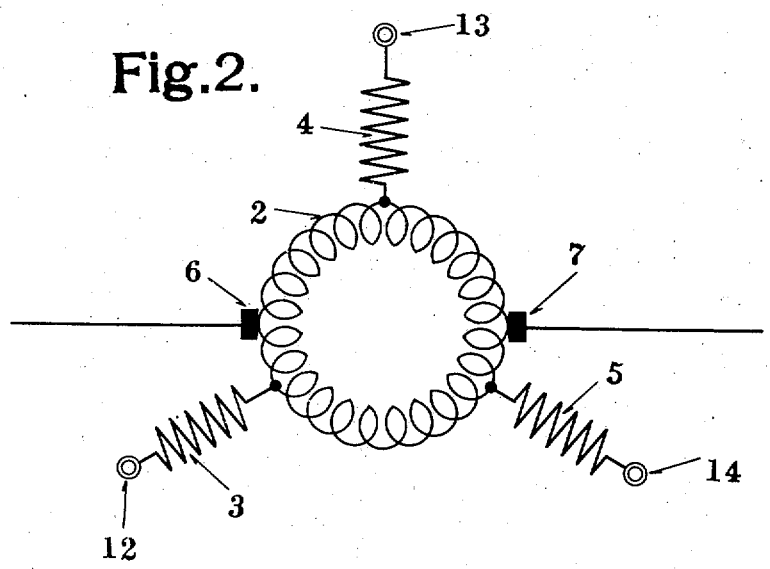

My invention relates to an alternating current motor capable of operating both as an induction and as a synchronous motor. Figure 1 is a diagrammatic representation of a two-pole polyphase motor embodying the invention, and Figure 2 more clearly represents the windings on the revolving member. My invention is applicable to single as well as to polyphase motors, but I will first describe it as applied to a polyphase machine.

I prefer to make use of a structure without defined polar projections on either member as is customary for single and polyphase induction motors, and while the primary member may be either stationary or revolving, I will describe my improvements as applied to a motor with a revolving primary. This revolving primary carries a commuted winding 2 combined and interconnected with a star connected polyphase winding, 3, 4, 5, the commuted winding 2 being located in the center or zero point of the star. This commuted winding can be looked upon as a delta connected three-phase winding located at the middle point of the star connected three-phase winding 3, 4, 5. Slip-rings 12, 13, 14 are attached to one end of each of the three phases of the star connected polyphase rotor winding and provide the means for connecting the machine to the supply. Brushes 6, 7 cooperate with the commuted winding 2 by means of a commutator such as is usually used in connection with such windings, and these brushes are connected to a winding 8 located on the stator, the axis of this winding being displaced from the brush axis by a small angle. One value of this angle which I have found to give good results lies in the neighborhood of 20 electrical degrees. A regulating resistance 11 is included in the circuit of this winding 8. The stator further carries a winding 9 displaced by 90 electrical degrees from the winding 8 and adapted to be closed over an adjustable resistance 10, all of which can, when desired, be cut out of circuit.

Referring to the operation of the motor shown in Figure 1, at starting a certain amount of resistance is included in the circuit of each of the stator windings 8 and 9, the former being left connected to the brushes 6, 7 and the slip-rings are connected to the supply. The two stator windings now do duty as polyphase secondary or induced windings and the machine starts with good torque and relatively small current. As the speed increases, the resistance in circuit with each of the two stator windings can be reduced in one or more steps until the winding 9 is short-circuited and the resistance of the circuit containing the winding 8 has been brought back to its operating value. As the speed increases, the induction motor torque of the machine decreases and becomes very small indeed, near synchronism, and is incapable of bringing the machine into synchronism. It is, however, desirable to cause the machine to run synchronously in normal operation for the reason that the power factor of such a motor can be readily adjusted if provision is made for producing a unidirectional excitation through the machine. In this case the unidirectional excitation is derived from the commuted winding 2, which, at synchronism, acts like a converter winding in a manner now well understood. The direct current derived from the winding 2 at synchronous speed is conducted through the stator winding 8 and the latter produces the desired unidirectional magnetization. But this winding 8, being so connected to the rotor that the E. M. F. induced therein and the E. M. F. conductively impressed thereon from the commutator are in such relative direction as to cooperate in producing current therein, also develops a synchronizing torque tending to pull the machine into synchronism. The smaller the angular displacement of the winding 8 from the brush axis the better the synchronizing torque, and by making this displacement less than 45 electrical degrees the winding both produces a good synchronizing torque and a unidirectional excitation in synchronous operation, one component of which is so located as to satisfactorily influence the power factor. I have found that angles from 10 to 30 electrical degrees give good results.

Should the machine at any time become overloaded when operating as a synchronous motor and fall out of step, it will continue to operate with good torque as an induction motor, the two stator windings 8 and 9 again doing duty as polyphase secondary or induced windings.

In order to secure the best utilization of the winding space on the rotor, and at the same time secure such a low voltage on the commutator as will permit of a sufficiently small number of turns per commutator bar to insure perfect commutation, I have combined the commuted winding 2 with the three-phase star winding 3, 4, 5, placing the former in the middle of the star. It will be understood that this commuted winding acts like the armature winding of an ordinary rotary converter and in order to take the fullest advantage of this condition, I prefer whenever possible, to so select the constants of my machine as to make the unidirectional exciting current sent into the winding 8 under synchronous operation about equal to the alternating current sent into the rotor. Under these conditions, the copper losses in the commuted winding 2 will be equal to the corresponding losses of a fully loaded converter and consequently less than the losses which would result in this winding if it carried the direct current only or the alternating current without the direct current.

In applying these improvements to a single-phase motor, it is only necessary to remember that the armature reaction in the single-phase machine has one unidirectional component and another component of double frequency. The short-circuited winding 9 on the stator can damp out or eliminate this double frequency component, and the machine may be started in any well known manner applicable to the starting of single-phase motors.

If, in the machine herein described, the brush axis is made to coincide with the axis of the winding 8 the E. M. F. impressed on the winding 8 will be co-phasal with the E. M. F. induced therein by the primary winding, and the torque,—the resultant of the induction motor torque and the pulsating torque due to the impressed E. M. F.—has the highest possible value. The torque existing just prior to synchronism and which is hereinbefore referred to as "synchronizing torque", is almost entirely due to the impressed E. M. F. since at this time the induced E. M. F. has become almost zero. Displacing the brushes from the coaxial position decreases the value of the accelerating torque for the reason that the E. M. F. induced and the E. M. F. impressed on the winding 8 are no longer co-phasal and decreases the value of the synchronizing torque since it will then have negative components, but the torque curve is such that displacement of the brushes 20 degrees, for example, from the exciting winding does not as greatly diminish either the accelerating or synchronizing torque as would a shift from a 20 degree position to a 40 degree position.

When the brushes are coaxial with the exciting winding 8 the synchronizing torque is "unidirectional" in that it has no negative component, and by the expression "substantially unidirectional synchronizing torque" used in the claims, I intend to include not only exactly unidirectional synchronizing torque but torques in which the negative maxima are less than 18% of the positive maxima, or in other words, when the angle between the brush axis and the axis of the exciting winding 8 is less than 45 degrees. Also the E. M. F. induced in the exciting winding 8 and the E. M. F. impressed thereon are to be deemed to be of "about the same phase" when the brushes are coaxial with the exciting winding or displaced therefrom by an angle less than 45 electrical degrees. The magnitude of the effective auxiliary voltage impressed on the winding 8 from the brushes, remains substantially constant during the accelerating and synchronizing period and is of slip frequency.

Having fully described my invention, what I claim as new and desire to secure by Letters Patent of the United States is:

1. In a synchronous-induction motor, the combination of an inducing member provided with a commutator and brushes thereon, means for supplying alternating current to the inducing member, and an induced member having an exciting winding displaced by a small angle from the axis of said brushes, said angle being less than 45 electrical degrees.

2. In a synchronous-induction motor, the combination of an inducing member provided with a commutator and brushes thereon, means for supplying alternating current to the inducing member, an induced member having an exciting winding in circuit with the brushes and displaced by a small angle from the axis of said brushes, said angle being less than 45 electrical degrees, and a second winding on the induced member and displaced from the exciting winding.

3. In a synchronous-induction motor, the combination of an inducing member provided with a commutator and brushes thereon, means for supplying alternating current to the inducing member, an induced member having an exciting winding in circuit with the brushes and displaced by a small angle from the axis of said brushes, said angle being less than 45 electrical degrees, and a second winding on the induced member closed on itself and displaced from the exciting winding.

4. In a synchronous-induction motor, the combination of an inducing member provided with a commutator and brushes thereon, means for supplying alternating current to the inducing member, an induced member having an exciting winding in circuit with the brushes and displaced by a small angle from the axis of said brushes, said angle being less than 45 electrical degrees, a resistance in circuit with said exciting winding, and means for cutting out said resistance after the motor is started.

5. In a synchronous-induction motor, the combination of an inducing member provided with a commutator and brushes thereon, means for supplying alternating current to the inducing member, an induced member having an exciting winding in circuit with the brushes and displaced by a small angle from the axis of said brushes, said angle being less than 45 electrical degrees, a second winding on the induced member closed on itself and displaced from the exciting winding, a resistance in circuit with the exciting winding, and means for cutting out said resistance after the motor is started.

6. In a synchronous-induction motor, the combination of a rotor provided with a commutator and slip-rings, brushes on the commutator, a stator having an exciting winding displaced by a small angle from the axis of the brushes and in circuit therewith, said angle being less than 45 electrical degrees, a second winding on the stator closed on itself and displaced from the exciting winding, resistances in circuit with each of said stator windings, and means for cutting out said resistances after the motor is started.

7. In a synchronous-induction motor, the combination of a rotor provided with a commuted winding and a polyphase winding, said windings being interconnected, a commutator and slip-rings connected to the commuted and polyphase windings respectively, brushes on the commutator, a stator having an exciting winding in circuit with said brushes and displaced therefrom by an angle less than 45 electrical degrees, a second winding on the stator displaced from the exciting winding, resistances in circuit with each of said stator windings, and means for cutting out said resistances after the motor is started.

8. In a synchronous-induction motor, the combination of an inducing member provided with a commutator and brushes thereon, means for supplying alternating current to the inducing member, and an induced member having an exciting winding in circuit with the brushes and displaced by more than 45 electrical degrees from that axis of the machine which is at right angles to the brush axis.

9. The method of operating a motor which carries variable load at synchronous speed, comprising, producing a primary flux which revolves with respect to the primary, causing the primary flux to generate starting-torque-producing ampere turns in a circuit on the secondary, producing an auxiliary voltage of slip frequency which becomes unidirectional and differs from zero at synchronism, and impressing the auxiliary voltage on the starting-torque-producing circuit on the secondary to produce a substantially unidirectional synchronizing torque.

10. The method of operating a motor which carries variable load at synchronous speed, comprising, producing between the stator and rotor near synchronism a substantially unidirectional synchronizing torque and causing this torque to lock the motor in synchronism.

11. The method of operating a motor which carries variable load at synchronous speed, comprising, producing between the stator and rotor near synchronism a substantially unidirectional synchronizing torque causing the torque increase as synchronism is approached and maintaining the torque until synchronism is reached.

12. The method of operating a motor which carries variable load at synchronous speed, comprising, starting the motor by producing between the stator and the rotor an induction motor torque which decreases as synchronism is approached and synchronizing the motor by producing a substantially unidirectional torque which increases until synchronism is reached.

13. A motor which carries variable load at synchronous speed, having a primary member carrying a winding adapted to produce a primary flux which revolves with respect to the primary, a secondary member and a circuit thereon in inductive relation to the primary flux, a source of auxiliary voltage of slip frequency which becomes unidirectional and differs from zero at synchronism, and means adapted to produce near synchronism and in cooperation with said primary flux a substantially unidirectional synchronizing torque which is maintained until synchronism is reached, said means including the circuit on the secondary and said source for setting up at sub-synchronous speeds secondary ampere turns of about the same phase as the ampere turns generated in said secondary circuit by the primary flux.

14. A motor which carries variable load at synchronous speed, having a primary member carrying a winding adapted to produce a primary flux which revolves with respect to the primary, a secondary member and circuits thereon adapted to magnetize the secondary along displaced axes and to start the machine as an induction motor, a source of auxiliary voltage of slip frequency which becomes unidirectional and differs from zero at synchronism, and means adapted to produce near synchronism and in cooperation with said primary flux a substantially unidirectional synchronizing torque which is maintained until synchronism is reached, said means including one of the circuits on the secondary and said source for setting up at sub-synchronous speeds auxiliary secondary ampereturns of about the same phase as the ampereturns generated in the same secondary circuit by the primary flux.

15. The method of operating a motor which carries variable load at synchronous speed, comprising, producing a primary flux which revolves with respect to the primary, causing the primary flux to generate induction-motor-torque producing ampereturns on the secondary, introducing into a winding on the secondary an auxiliary voltage of same frequency and of about the same phase as the voltage generated in the secondary winding by the primary flux at nearly synchronous speeds, and maintaining the magnitude of the auxiliary voltage until synchronism is reached to produce a synchronizing torque.

16. A motor which carries variable load at synchronous speed, comprising, a primary member having a winding adapted to produce a primary flux which revolves with respect to the primary, a secondary member having a winding, means for producing and impressing on the secondary winding a synchronizing voltage of a magnitude independent of its frequency and of same frequency as that of the voltage generated in said winding by the primary flux, and means for controlling the phase of the synchronizing voltage adapted, at speeds very near the synchronous, to cause it to pass through zero approximately when the axis of the secondary winding coincides with the axis of the primary flux.

17. A motor which carries variable load at synchronous speed, having a primary member adapted to produce a primary flux which revolves with respect to the primary, a secondary member having a winding in inductive relation to the primary flux, a source of auxiliary voltage, and means including the winding on the secondary and said source adapted to produce a substantially unidirectional and pulsating synchronizing torque between primary and secondary members, whereby the motor can be brought into synchronism and caused to operate synchronously at a plurality of loads.

18. A synchronous motor adapted for operation as an induction motor at sub-synchronous speeds and comprising an inducing member provided with a commutator and slip rings, brushes on the commutator, an induced member having an exciting winding displaced by a small angle from the axis of the brushes and in circuit therewith, said angle being not greater than approximately 30 electrical degrees and not less than approximately 10 electrical degrees, and a second winding on the induced member, said winding being closed on itself and displaced from the exciting winding.

In testimony whereof, I hereunto affix my signature, this 15th day of October, 1926.

HANS WEICHSEL